Figure 1:
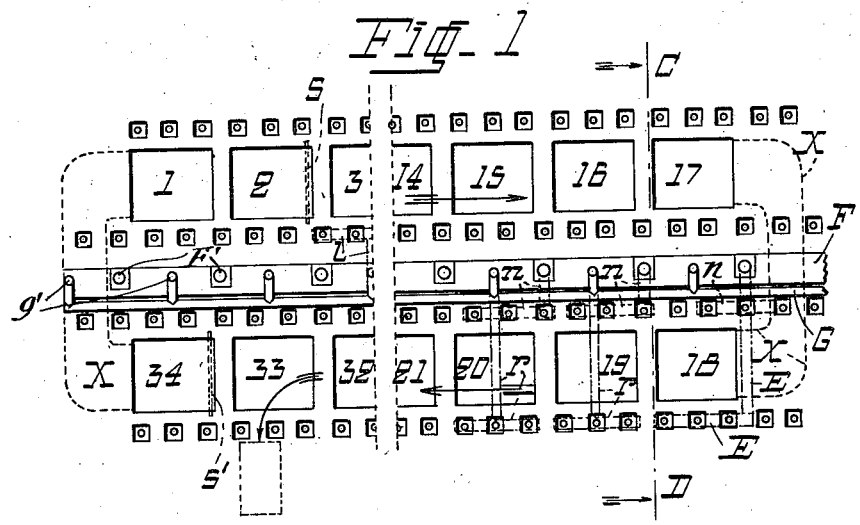

J. R. C. RUDOLPHS & A. G. THISELL.
METHOD OF EFFECTING CHEMICAL REACTIONS BETWEEN SOLID MATTERS AND GASES OR GAS MIXTURES.
APPLICATION FILED JUNE 27, 1911.

1,173,390.

Patented Feb. 29, 1916.
2 SHEETS—SHEET 1.

Witnesses:-
C. S. Sundgren
F. George Barry.

Inventors:-
John Rudolph Christian Rudolphs,
Anders Gustaf Thisell
by their attorneys

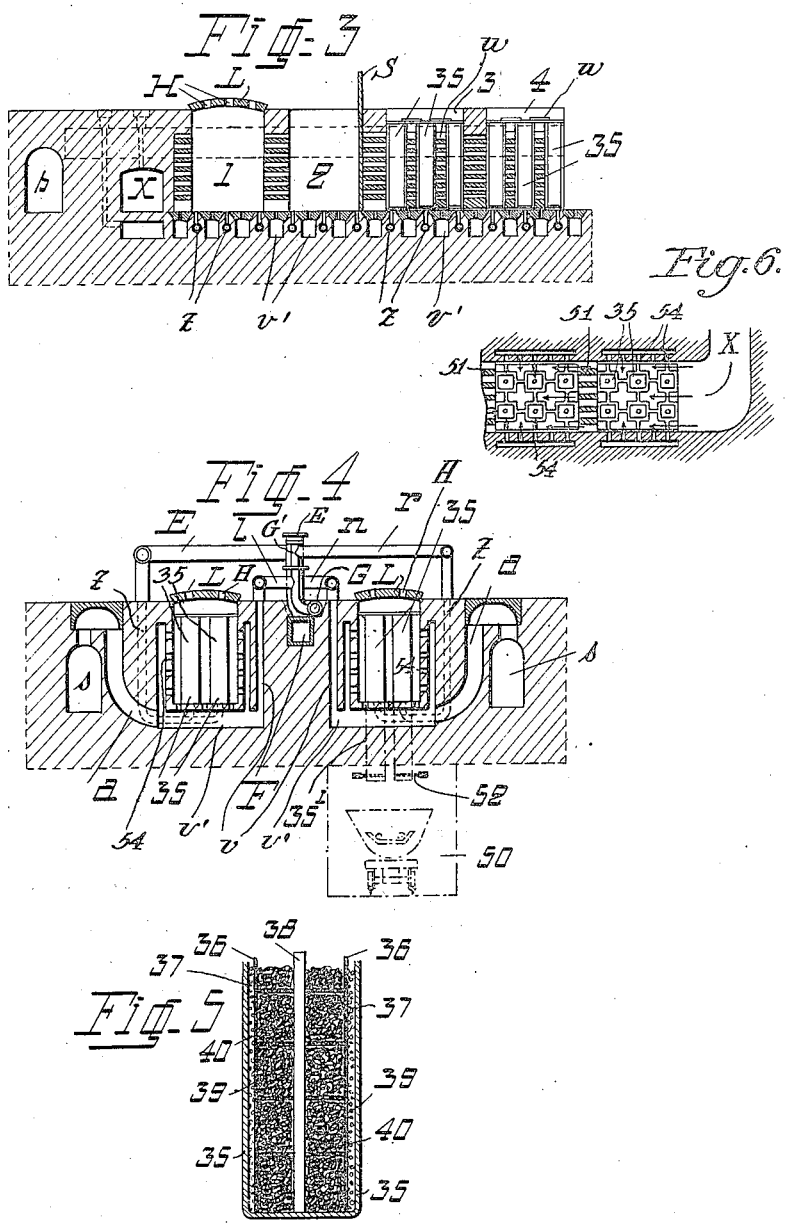

UNITED STATES PATENT OFFICE.

JOHN RUDOLPH CHRISTIAN RUDOLPHS, OF NACKA, AND ANDERS GUSTAF THISELL, OF STOCKHOLM, SWEDEN.

METHOD OF EFFECTING CHEMICAL REACTIONS BETWEEN SOLID MATTERS AND GASES OR GAS MIXTURES.

1,173,390.  Specification of Letters Patent.  Patented Feb. 29, 1916.

Application filed June 27, 1911. Serial No. 635,625.

*To all whom it may concern:*

Be it known that we, JOHN RUDOLPH CHRISTIAN RUDOLPHS, a subject of the King of Sweden, and resident of Nacka, in the Kingdom of Sweden, and ANDERS GUSTAF THISELL, a subject of the King of Sweden, and resident of Nybrogatan 36, Stockholm, in the Kingdom of Sweden, have invented certain new and useful Improvements in the Method of Effecting Chemical Reactions Between Solid Matters and Gases or Gas Mixtures, of which the following is a specification, reference being had therein to the accompanying drawings.

This invention relates to a method of effecting chemical reactions between solid matters and gases or gas mixtures. The invention also comprises arrangements in furnaces adapted to the carrying out of the said method. The method can be used for effecting the most different reactions between solid matters and gaseous matters. For instance may be mentioned the reduction of metallic oxids as oxids of iron, magnesium, barium, chrome, copper and so on either alone or mixed with each other or with other matters by the action of reducing gases, for instance producer gas or hydrogen gas.

As a further example of the application of the invention may be mentioned the effecting of azotizing operations for instance for the manufacturing of lime-nitrogen by the action of nitrogen upon calcium-carbid at an increased temperature. Also silicic acid may be removed from carbon mixtures or metallic oxids by passing fluorin through such matters. The method may be used also for the chlorinizing of matters. Two or more reactions may also be effected one after the other, for instance roasting and reduction in the manufacturing of iron-sponge from iron-slick. The said method is characterized substantially by the fact that the solid matter, finely divided if necessary and contained in casings of chamotte or other suitable receptacles, are inclosed in chambers, arranged in accordance with the annular kiln system, and are adapted to be heated from the exterior one after the other. The solid matter is subjected to the action of the preferably pre-heated reaction gas or gas mixture, or if required, to the successive actions of two or more different gases or gas mixtures, which under pressure are forced through the matter inclosed in the said casings without the reaction gas being in contact with the heating gas before or during the reaction, the products of combustion of the heating gas being then led through chambers located in advance of the chamber or chambers in which the reaction is taking place for the purpose of pre-heating.

In order to prevent the matter subjected to reaction from sticking to the fire-proof casings (for instance when formed of chamotte) containing the matter, and, if necessary, to also prevent the reaction gases from attacking the said casings, and to facilitate the passage of the reaction gas through the material treated, a porous layer of lime, carbon, or other material dependent on the nature of the material being treated, is provided between the matter and the casing.

In the practical realization of the method, it is preferable to proceed in such a manner that when the matter is charged into the casings one or more vertical channels are formed with walls of as uniform thickness as possible, or the matter is arranged as uniformly as possible around one or more perforated tubes, in which channels or tubes the reaction gas is introduced under pressure, preferably at their bottom ends, and is then forced by the pressure from the channels or tubes into and through the porous matter. The said vertical channels are preferably filled with a pulverulent matter, adapted partially to act in some manner upon the reaction gas or upon the material, which is treated, partially to have a retarding action upon the gas passing through the said channels and thus to facilitate the passing of the gas laterally through the matter. As an example of such a material, carbon powder may be mentioned. If, for instance, the reaction gas consists of a reducing gas, for instance producer gas, carbonic acid, if present in the reaction gas, is reduced by the carbon powder to carbon monoxid which also has a reducing action.

The invention will now be described as applied by way of example to the treatment of pulverulent iron ore for the production of iron sponge, during which treatment and in the same heat, but in different operations, the roasting operation for removing the sulfur from the ore is performed, as well as the reduction of the iron oxid.

Figure 2:
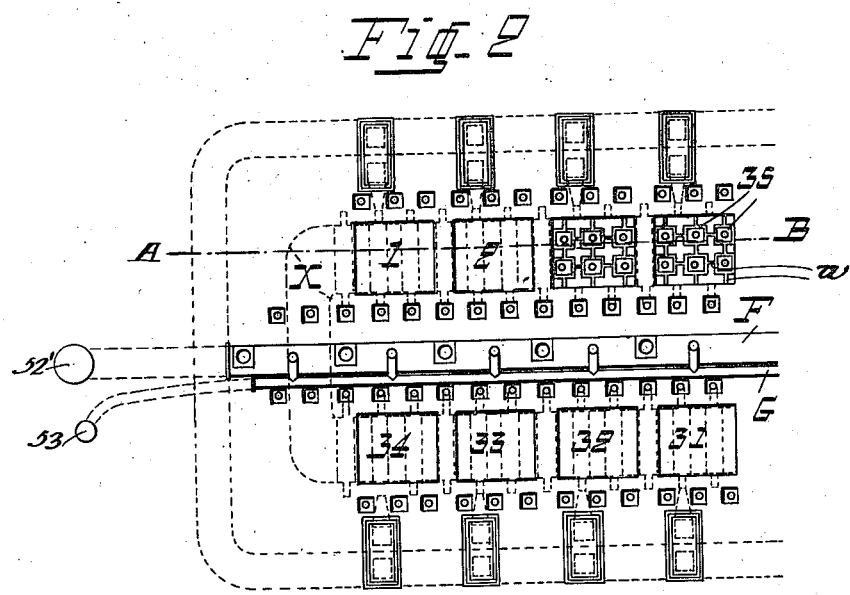

In the accompanying drawings, Figure 1 is a diagrammatic plan view of a furnace constructed in accordance with the invention, the center part of the furnace being omitted to avoid needless repetition. Fig. 2 shows also in a plan and detail view a part of the furnace. Fig. 3 is a vertical section of the furnace on the line A—B of Fig. 2. Fig. 4 is a vertical section on the line C—D of Fig. 1, the transmitting pipes being shown located at the chambers 17 and 18. Fig. 5 is a vertical section of a casing and illustrates the charging thereof. Fig. 6 schematically shows a horizontal section through two chambers in order to illustrate the passage of air and gas.

The furnace for carrying out the invention consists of a number of chambers located in two rows. In the drawing an arrangement of thirty-four chambers is indicated, located in two rows with seventeen chambers in each row and designated by 1 to 34 inclusive. The said rows of chambers communicate at the ends of the furnace through conduits X, X, and in each row the chambers communicate with each other by means of openings 51 in the brickwork (Figs. 3 and 6). Thus gas and air can pass freely from one chamber to another in each row, and from one row to another. Each chamber has a removable cover L and between the two rows of chambers, two conduits F and G are located, one F adapted for supplying producer gas and the other G for supplying air. The tubes G and F are provided with vertical pipe branchings G' and F' respectively.

Removable transmitting tubes $r$ and $l$ can be connected to the pipe G', and removable transmitting tubes E and $n$ can be connected to the pipe F', so that either air from conduit G or producer gas from conduit F may be led into the casings through the channels $z$ in the walls of the furnace by means of the transmitting tubes $r$ and E, or air from G and gas from F may, by means of transmitting tubes $l$ and $n$ respectively, be led to the chambers surrounding the casings through the conduits $v$ and $v'$. The gas and air last mentioned only serve to heat the casings externally and never come into contact with the material contained within the casings.

In Fig. 4, all the transmitting tubes E, $r$, $l$ and $n$ are shown, though in practical operation they never occupy the position shown simultaneously on one chamber, as will be clear from the following description.

Four chambers are shown in Fig. 3; two (1, 2) of the said chambers are empty and two (3, 4) are provided with casings. In each chamber a number of casings (in the drawings six casings) are provided, containing the pulverulent ore to be treated in the manner described below. Between the casings, located in the chambers, fire-proof bricks $w$ (Fig. 3) are provided in order to support the casings, as shown in Figs. 2 and 3, said bricks being arranged so as to form a grate so that complete communication for gas and air between the casings is secured.

The casings are charged in the following manner, (see Fig. 5). In the empty casing 35, a box 36 of sheet metal is located. In the space between the said box and the inner sides of the casing a layer 37 of pulverized lime, magnesite or any other suitable material is provided, and after placing one or more cores 38 in the box, the latter is filled with pulverulent ore 39. The charging of the said ore is effected preferably in such manner that on each layer of ore 20 to 30 centimeters in height, located in the casing, a thin layer 40 of pulverized lime or any other suitable material is applied, which prevents the pulverulent ore from forming a single piece along the whole height of the furnace during the subsequent heating operation. When the charging has been effected, the box 36 and the cores 38 are withdrawn, so that a pillar is left in each casing provided with one or more vertical channels. Instead of using a core which is withdrawn after the casings have been charged, tubes may be used, the walls of which are perforated, and which are not withdrawn, but remain in the material during the operation. In this case the tube or tubes form the vertical channel or channels. The said channels may be covered with a piece of chamotte for instance. When all the casings have been charged the cover L is placed on the chamber, which is then connected with the system.

As indicated by dotted lines in Fig. 4, channels 50 can be provided under the respective rows of chambers extending longitudinally thereof. Only one channel is shown in Fig. 4, and a track is provided for transport wagons. In this case longer casings 35' are used which extend downward for some distance into the channel 50 and are provided at their bottom ends with a slide 52 or any other closing device, for the purpose of facilitating the emptying of the casings. This arrangement is not suitable for use when iron ore is treated, but can be used in the case of producing materials such as lime nitrogen which are not liable to stick in the casings. In this case the reaction gas is introduced into the upper end of the casings. The conduits which are used for this purpose are not, however, shown in the drawings.

The furnace operates in the following manner. It is assumed that the chambers 1 and 2, which, when pulverulent iron ore is treated, as stated above, contain wholly reduced ore, are being emptied in order to be subsequently recharged. The damper S separating the chambers 1 and 2 from the subsequent chambers is then in the position indicated in Figs. 1 and 3. Other dampers provided in the furnace are so located that air from the conduit G is forced through a movable transmitting pipe $l$ and the conduits $v$, $v'$, into the chamber 3 and then passes through the subsequent chambers, which together with their contents are successively cooled, while the air passing through the same is successively heated. It is also assumed that reduction is to be effected in the chamber 18 and oxidation in the chambers 19, 20 and 21. The chambers 18 to 21 inclusive have then been heated to a suitable temperature by burning producer gas supplied from conduit F through transmitting pipes $n$, conduits $v$, $v'$, and openings 54 in the chamber walls by means of the air pre-heated in the chambers 3 to 17 inclusive.

Fig. 6 schematically illustrates how air and gas are supplied to the chambers inclosing the casings. It is supposed that the chambers shown in this figure are Nos. 18 and 19. Air, having passed through and been pre-heated in, the chambers 3 to 17, passes through the conduit X into the chamber 18 and from there through the openings 51 in the brickwork into the chamber 19, the principal direction of the air current being indicated by arrows lying in the longitudinal direction of the furnace. The gas is introduced into the chambers from the space surrounding them through openings 54, the principal direction of the gas current being indicated by arrows in the transverse direction of the furnace. The flames thus generated inclose the casings and heat the ore contained in the same to a suitable temperature, for instance 1000° centigrade or more. The products of combustion, however, never come into contact with the ore in the casings. While the combustion gases pass through the chambers 22 to 33 inclusive, their heat is transmitted to the casings located in the said chambers, the charges of which are thereby pre-heated gradually. From the chamber 33, the casings of which have been charged lastly, the said gases are led through the channel $a$ to the conduit $s$ and to the chimney.

In order to effect a rational oxidation and reduction of the ore charged in the furnace, special channels are provided, through which air and gas can be supplied to the casings alternately. When the pulverulent ore located in the chambers 19, 20, 21, has the temperature necessary for the oxidation of the impurities, air is introduced into the casings through the transmitting pipes $r$ and conduits $z$ from the air channels G (see right side Fig. 4) which air is subjected to pressure effected by a fan (not shown). The impurities, especially sulfur, are thereby oxidized. The ore contained in the casings of the chamber 18 has already been freed from impurities in the described manner and is now ready for the reducing operation. For effecting the said reduction carbon powder or any other reducing agent is first introduced through normally closed holes H in the cover L of the chamber (see Fig. 3), and owing to the fact that the said holes communicate with the vertical channels provided in the ore contained in the casings, the said vertical channels are filled with carbon powder or the reducing agent. After the channels have thus been filled, the holes H are closed by suitable means, and the casings in the chamber 18 are put into communication with the gas channel F through a transmitting pipe E (left side Fig. 4) which communicates with the channels $z$ in the walls, through which the gas is led, through the bottom of the furnace, so that the vertical channels in the ore are supplied with gas from their bottom upward. The said gas is prevented by the pulverized reducing agent and by plugs closing the upper ends of the vertical channels from escaping at the top of the channels and carbonic acid, which the gas may contain, is converted into carbon monoxid by the reducing agent. Besides, the velocity of the gas is reduced by the said reducing agent so that the gas is forced into the porous mass, and, coöperating with the reducing agent, exercises a reducing action in the known manner. The casings 35 are open at the top and the charge of the same is covered with carbon powder for protecting the said charge from being acted upon by the gases in the top space of the chamber. The reduction gases having been forced through the charge of the casing, escape through the open top end of the same into the chambers and continue for the purpose of pre-heating, through the chambers in advance and then to the chimney.

When the reducing operation in the chamber 18 has proceeded to the desired degree, the transmitting pipe $r$ is moved from the chamber 19 to the chamber 21 in order to introduce air for effecting oxidation in the same, and the transmitting pipe E is moved from the chamber 18 to the chamber 19, in which consequently reduction is effected. The chamber 18 is now cooled and during the cooling operation the reducing operation in the same is finished, if necessary. The damper S is then moved forward for instance to the chamber 4 and the damper $S_1$ is so located that the combustion gases will pass through and escape from one of the freshly charged chambers, which have been connected with the system. The operations are then repeated in the described manner.

Reactions between other solid matters and gases are effected in a manner analogous to the manner described above. For the production of lime-nitrogen, for instance, the casings are filled with pulverulent calcium-carbid, while nitrogen gas, preferably preheated, is introduced through the conduit G. In other respects the operation is effected in a manner analogous to that described above.

What we claim is:

1. The method of effecting chemical reactions between solid matter and gaseous material at an increased temperature, consisting in subjecting the solid matter, while held in parcels adapted to be successively heated from the outside, to the action of the gaseous material by forcing the latter under pressure through the said parcels of solid matter without bringing the reaction gas in contact with the heating gas and preheating the said parcels of solid matter by the products of combustion of the heating gas in advance of the introduction of the gaseous reaction material.

2. The method of effecting chemical reactions between solid matter and gaseous material at an increased temperature, consisting in subjecting the solid matter, while held in parcels adapted to be successively heated from the outside, to the action of the gaseous material by forcing the latter under pressure through the said parcels of solid matter without bringing the reaction gas in contact with the heating gas and preheating the said parcels of solid matter by the products of combustion of the heating gas and the products of reaction of the gaseous material in advance of the introduction of the gaseous reaction material.

3. The method of effecting chemical reactions between solid matter and gaseous material at an increased temperature, consisting in subjecting the solid matter, while held in parcels adapted to be successively heated from the outside, to the action of a plurality of reaction gases by forcing the said reaction gases under pressure successively through the said parcels of solid matter without bringing the reaction gases in contact with the heating gas, and preheating the said parcels by the products of combustion of the heating gas and the products of reaction of the reaction gas in advance of the introduction of the reaction gas.

4. The method of effecting chemical reactions between solid matter and gaseous material at an increased temperature, consisting in subjecting the solid matter, while held in parcels adapted to be successively heated from the outside, to the action of reaction gas by introducing a restraining mass of porous material between the matter to be treated and the reaction gas, forcing the reaction gas under pressure through the said porous material and parcels of solid matter without bringing the reaction gas in contact with the heating gas and preheating the said parcels by the products of combustion of the heating gas and the products of reaction of the reaction gas in advance of the introduction of the reaction gas.

In witness whereof, we have hereunto signed our names in the presence of two subscribing witnesses.

JOHN RUDOLPH CHRISTIAN RUDOLPHS.
ANDERS GUSTAF THISELL.

Witnesses:
THORWALD NYSTROM,
AXEL EHRUER.